UNITED STATES PATENT OFFICE.

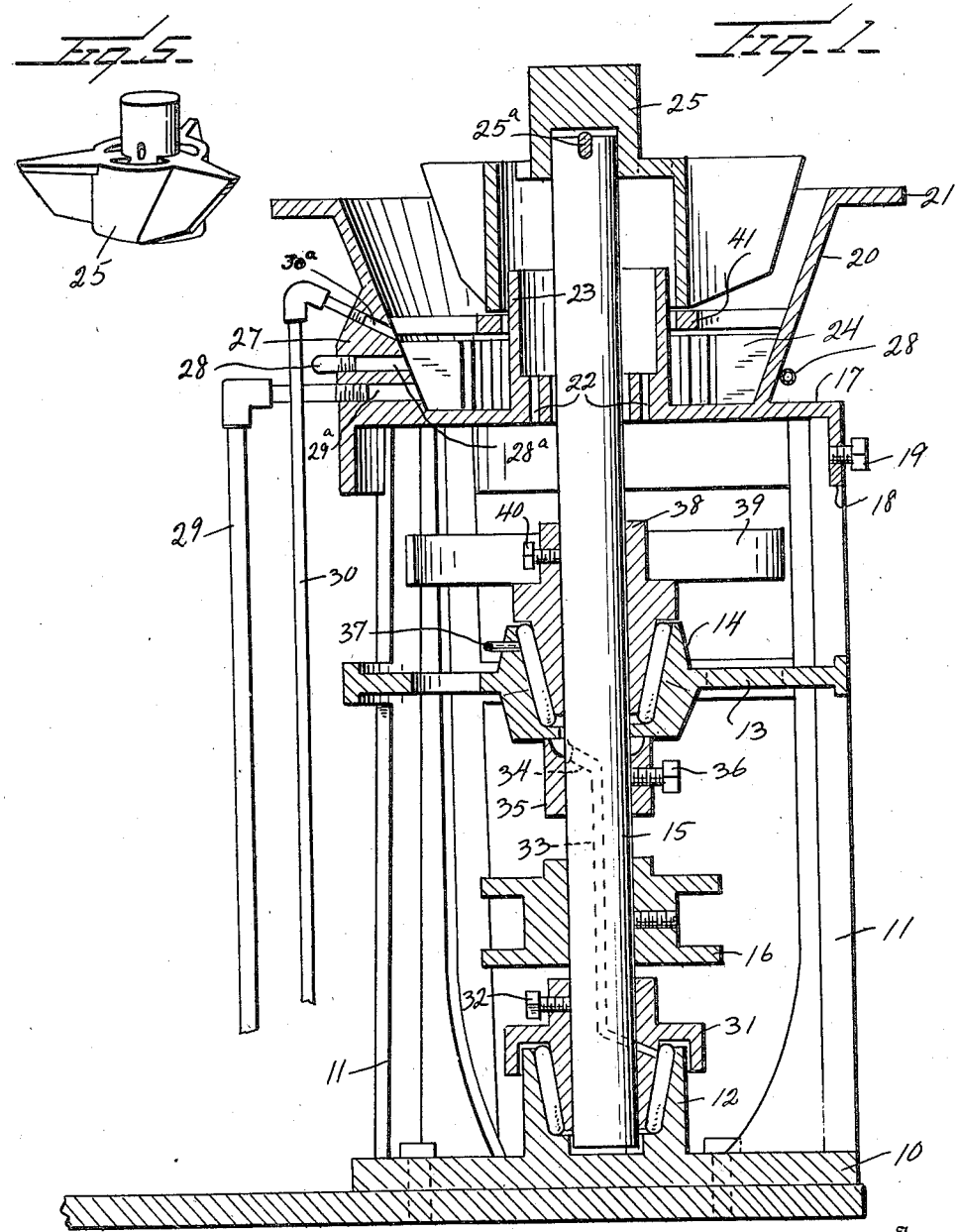

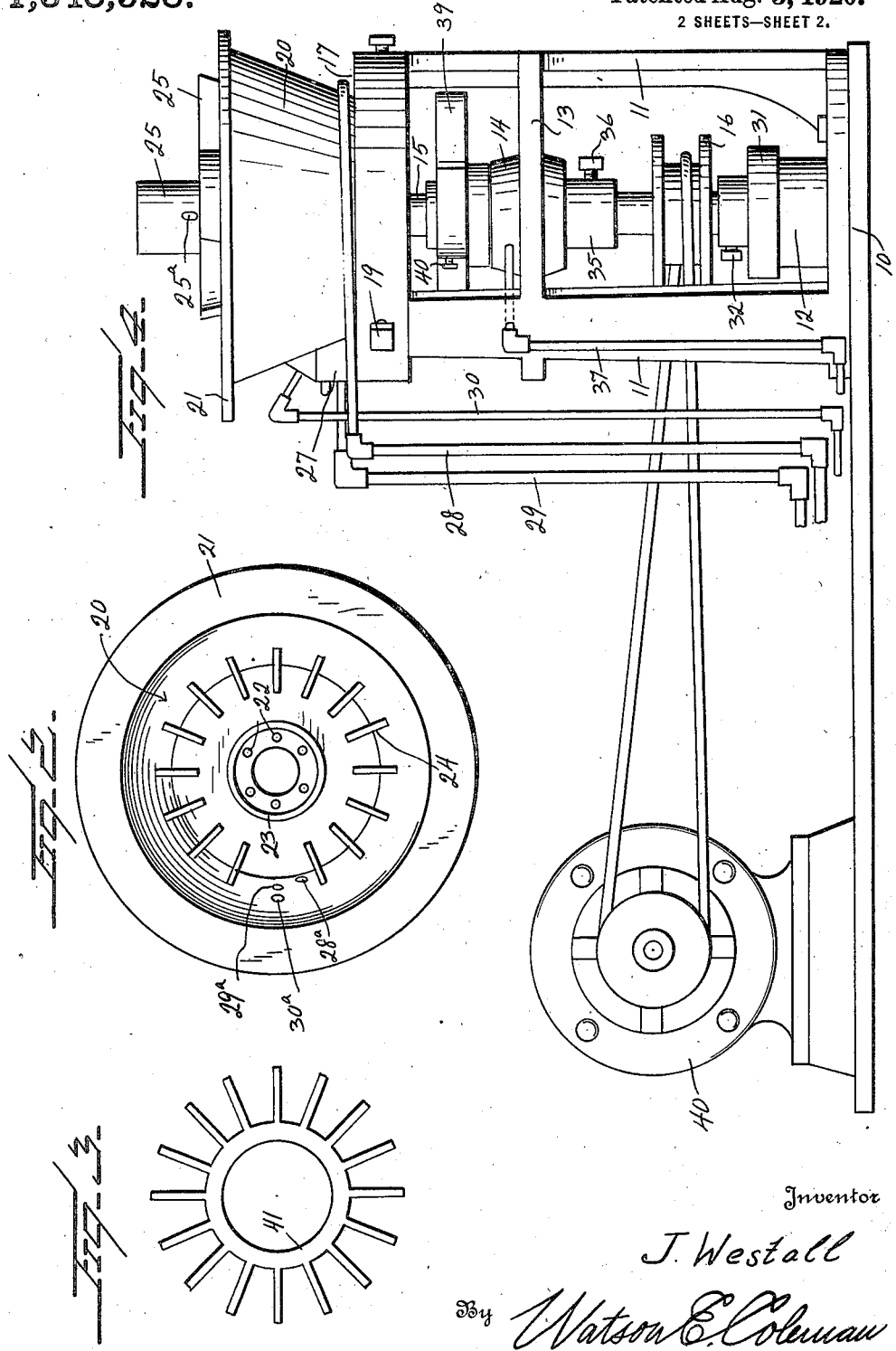

JOHN WESTALL, OF FALL RIVER, MASSACHUSETTS.

CRUDE-OIL BURNER.

1,348,528. Specification of Letters Patent. Patented Aug. 3, 1920.

Application filed January 14, 1920. Serial No. 351,340.

*To all whom it may concern:*

Be it known that I, JOHN WESTALL, a citizen of the United States, residing at Fall River, in the county of Bristol and State of Massachusetts, have invented certain new and useful Improvements in Crude-Oil Burners, of which the following is a specification, reference being had to the accompanying drawings.

This invention relates to oil burners, and particularly to certain improvements upon the crude oil burner forming the subject matter of Patent #1,293,590, issued to me on February 4, 1919.

This invention has the same general object as that stated in my prior patent, namely to provide a burner primarily designed for use in connection with heating furnaces of either the hot air or hot water type and having means for breaking up the partly vaporized oil and thoroughly mixing the same with air, whereby to secure complete combustion, and to provide a burner of a very simple character which may be cheaply and durably constructed, and which may be readily mounted in operative position.

A further object is to provide a construction of this character including a burner plate or bowl, a rotating breaker disposed within the bowl and acting to break up and more thoroughly mix the vapor with air, and to provide means for forcing cool air through the bottom of the burner plate to thereby assist in the formation of a proper mixture, said means also acting to draw cool air into the space immediately below the burner plate to thereby keep the remainder of the mechanism relatively cool.

A further object is to provide improved bearings for the shaft which supports and rotates the breaker, and means for keeping these bearings from getting overheated, and means for supplying oil to the bearings.

Another object is to provide means for preheating the oil prior to its discharge onto the burner plate, and provide for taking off any overflow so as to keep the oil at a constant level within the burner bowl, and in this connection to provide means preventing any accumulation of oil within the bowl if anything should stop the rotation of the breaker-carrying shaft or cause it to slow down.

A further object is to provide an auxiliary gas plate disposed within the burner plate so as to permit the burner to be run at a very slow fire and under these circumstances preventing the gas breaker from blowing out a small blaze.

Other objects will appear in the course of the following description.

My invention is illustrated in the accompanying drawings, wherein:—

Figure 1 is a vertical sectional view of an oil burner constructed in accordance with my invention;

Fig. 2 is a top plan view of the burner bowl;

Fig. 3 is a top plan view of the distributer plate;

Fig. 4 is a side elevation of the burner and the motor therefor;

Fig. 5 is a perspective view of the breaker which acts to break up and mix the vapor with the air.

Referring to these drawings, 10 designates a base having upwardly extending, integral supporting members 11 and carrying an upwardly extending, annular wall 12 for antifriction bearings, as will be hereafter described. Midway of the height of the legs, there is formed an integral spider 13, the central portion of which forms a bearing 14 for a central shaft 15. This central shaft 15 at its lower end extends into the bearing 12, and roller bearings, such as Timpkin bearings, are disposed within the bearing 12 and in the bearing 14 at the center of the spider. Carried upon the shaft 15 is a wide flanged drive pulley 16 operated by a belt from a motor or other suitable driving means. Engaged with the upper ends of the supports 11 is a plate 17, which is circular in form, and has a marginal flange which fits over the upper ends of the support 11 and rests upon shoulders 18 formed upon the outer faces of these supports and is engaged with them by set-screws 19. Integral with this plate and forming part thereof is an upwardly and outwardly extending wall 20 which, at its upper end, is outwardly flanged, as at 21. The burner plate and this wall together form a burner bowl, as it may be termed.

The plate 18 is formed with a central opening for the passage of the shaft 15 and surrounding this opening are a plurality of perforations 22 arranged concentrically to the shaft opening and extending downward through the plate. Exteriorly of this series of perforations is a relatively high, upwardly extending, annular wall 23. Exteriorly of this wall, the bottom of the plate is provided with a plurality of radial ribs 24.

The shaft 15, as before stated, passes up through the central opening in the plate, and mounted upon the upper end of this shaft is a rotatable gas breaker 25. The hub of this gas breaker is drilled to fit upon the upper portion of the shaft, and a pin 25ª goes through this portion of the gas breaker and fits in a slot in the shaft so that the gas breaker and the shaft have the same number of revolutions.

Integral with the central hub of the gas breaker are a plurality of radial arms or vanes, the upper edges of these arms being approximately 3" in length, while the lower edges are about 1" in length. These vanes are deflected into angular relation to the axis of the gas breaker, and are so formed that when the shaft and the gas breaker are rotated, they act to throw the blades upward and outward, while at the same time thoroughly mixing the air and the gas. Any number of these blades may be used, and I find in practice that the number of blades to be used on the gas breaker should increase with the heaviness of the oil to be used. I have illustrated three blades, but it will be understood that more blades or fewer blades may be used. It will be noted that the hub of the gas breaker is countersunk or recessed at its lower end so that the wall 23 extends up into this recess but is spaced from the outer wall thereof so that the air passing up through the perforations 22 will pass over the top of this wall 23 and be drawn downward and outward and then mixed with the gas and carried upward.

At one point in its diameter, the bowl of the burner is formed with a relatively thickened, radially projecting web 27 which extends down to the base plate 17. This web is bored to form an oil duct 28ª which is connected to an oil pipe 28. This intake pipe preferably extends around the exterior of the oil chamber in the form of a coil one or more times and then extends to a source of fuel. By this means, the heat of the burner preheats the relatively heavy and crude oil which may be used, which puts it in much better condition for vaporization than if this intake pipe entered the burner bowl directly without being coiled around the chamber. The number of coils around the burner depends upon the density of the fuel. If heavy oil of about 18 to 25 Saybolt is used, it cannot be heated too much before the oil goes into the burner, so that in this case the oil may pass around the burner bowl several times. If, however, the oil is about 30 Saybolt, no coil is required at all but the oil may enter the burner directly.

The supply of oil through the pipe 28 may be controlled by a needle valve of a Jenkins valve or any other suitable valve for this purpose. Extending through the web 27 below the duct 28ª is a duct 29ª constituting an overflow duct, which is connected to an overflow pipe 29 which drains the burner plate if more than ¼" of oil accumulates on the base of the burner plate. This overflow duct 29 prevents any accumulation of oil if anything should prevent the motor from running or if for any reason the flame should be blown out. It has the same diameter as the inlet duct, so that there can be no possible overflow if by any means the mechanism is stopped. If any accident causes the motor to stop and thus prevent the rapid burning of the oil, the amount of oil in the base of the burner bowl will only be sufficient to give the proper amount of heat and fire which is required to be maintained.

The pipe 29 is connected to an overflow tank from which the oil from time to time may be pumped or otherwise carried to the feed tank. Entering the web 27 is a duct 30ª which extends downward at an inclination toward the overflow duct but is disposed above it and constitutes the pilot light duct. This is connected by the pipe 30 either to a gas system or an auxiliary tank of oil. This pipe and duct supply a light if the furnace fire should go out. It will be understood, of course, that the oil in the base of the burner bowl is never high enough to put out this light. Of course, both the fuel pipe with the overflow pipe may be provided with suitable valves whereby passage therethrough may be controlled.

Disposed over the lower bearing 12 is a cap 31 which is secured to the shaft by a set-screw 32. This cap is adjustable on the cone of the roller bearing to carry the load of the shaft and other parts, which load is also supported by the upper bearing 14. The lower bearing is lubricated by a duct 33 which runs longitudinally through the lower portion of the shaft and opens into the lower bearing so as to permit oil to pass to the rollers thereof, and this duct at its upper end is angularly extended, as at 34, to the exterior of the shaft and is formed with a relatively large mouth. Mounted upon the shaft is a cup-shaped collar 35 held in place by a set-screw 36. The upper portion of this collar is formed to provide a cup to receive the lubricating oil from the upper roller bearing 14 and conduct this oil downward to the duct 33, whereby it is connected to the lower bearing. This oil is supplied to the upper bearing 14 by means of a pipe 37. Inasmuch as this cup-like collar 35 is disposed immediately below the lower end of the bearing 14, it follows that it prevents the shaft 15 from jumping out of place or moving upward.

Disposed upon the shaft 15 between the bottom of the burner plate and the upper end of the bearing 14 is a collar 38 having a plurality of outwardly extending blades 39, this collar being held in place upon the shaft 15 in any suitable manner and rotating therewith. The base of this collar 38 is disposed above and preferably rests upon the roller bearings of the bearing 14 so as to act as a cone and cap, covering the Timpkin roller bearing and preventing any dust or dirt getting into it. It is engaged with the shaft 15 by a set-screw 40 and thus acts with the cap 31 to support the shaft at any desired height so as to thereby support the breaker at any desired height within the burner bowl. The blades or vanes 39 act as a cooler or air distributer between the burner plate and the upper bearing when the machine is in operation, preventing the upper bearing from becoming overheated and also acting to force cool air through the perforations in the bottom of the burner plate, thus assisting in the vaporizing action.

The base plate 10 is extended laterally and acts as a support for an electric motor 40 which in actual practice is a motor of about ⅛ horse power either alternating or direct current rotating 1750 revolutions per minute. The speed of rotation of the breaker is to be regulated according to the density or viscosity of the oil. Thus, for example, with an oil of about 30 Saybolt, the shaft 15 will have a speed of rotation from 900 to 1000 R. P. M. in order that the oil may be vaporized or gasified without any smoke. Of course, I do not wish to be limited to the use of a belt for connecting the motor to the shaft 13, as gearing may be used.

Also used in connection with this device when necessary is an auxiliary gas plate, designated 41. This is an annular plate with a number of radial projections or arms, the extreme diameter of this plate with its arms being such as to fit within the burner bowl and rest upon the inclined wall thereof, with this auxiliary plate disposed below the gas breaker and exteriorly to the wall 23. The object of this plate is to prevent the gas breaker from blowing out a small blaze when using only a small amount of fuel oil, thus permitting the burner to be run with a very low fire.

In the operation of my improved burner, when the motor is started the oil first issuing from the coil 28 is ignited by the pilot light and then the heat of this burning oil tends to preheat and partially vaporize the oil within the coil 28. The breaker and mixer 25 is rotated at a high speed and acts to draw up air through the perforations 22 in the burner plate. The oil as it is vaporized is also drawn upward by the inclined vanes or blades on the breaker, and this oil and the air are thoroughly mixed by the rotating fan or breaker so that a completely combustible mixture is assured. Thus, kerosene and even heavier and cruder hydrocarbon oils may be utilized. I have found in practice that a very complete combustion is secured by means of this burner, so complete that it is practically smokeless and is particularly adapted for use for heating hot air or hot water furnaces. The overflow pipe 29 will conduct oil accumulating upon the burner plate back to the supply reservoir. Inasmuch as the pilot light is lighted at all times, it is obvious that it will consume any gas that may remain after the burner flame is extinguished, thus preventing explosions that might otherwise occur. It is also manifest that the device might be used for other purposes than for use in heating furnaces.

It is likewise obvious that many changes might be made in the details of construction and arrangement of parts without departing from the spirit of the invention.

I claim:—

1. In a burner of the character described, a combined burner plate and oil chamber having a centrally disposed shaft opening, a series of air inlet openings arranged around the shaft opening, an upstanding wall exteriorly of the air openings, a shaft extending upward through the burner plate, a breaker and mixer mounted upon the shaft and having blades disposed above the bottom of the burner plate and oil chamber, means for rotating the shaft, and means for discharging oil within the oil chamber and carrying off overflow therefrom.

2. In a crude oil burner, a combined burner plate and oil chamber having an upstanding, exterior wall, a central shaft opening, a series of air openings exteriorly of the shaft opening, and a wall exterior to the air openings, a shaft passing upward through the shaft opening of the burner plate and having a breaker thereon carrying a plurality of blades, a fuel pipe entering the burner chamber adjacent the bottom thereof, an overflow pipe entering the oil chamber above the overflow pipe but below the upper edge of the inner wall, and a pilot light disposed within the oil chamber.

3. In a crude oil burner, a combined burner plate and oil chamber having an upstanding, exterior wall, a central shaft opening, a series of air openings exteriorly of the shaft opening, and an auxiliary wall exterior to the air openings, a shaft passing upward through the burner plate and having a breaker thereon carrying a plurality of blades, a fuel pipe extending in a coil around the exterior of the oil chamber and then entering the oil chamber adjacent the bottom thereof, an overflow pipe extending from the oil chamber on a level above the fuel pipe but below the level of the upper edge of the inner wall, and a pilot light disposed within the oil chamber.

4. A crude oil burner including an oil chamber, the bottom of the oil chamber having a central aperture, means for admitting fuel into the oil chamber and preventing the level of the fuel from rising beyond a predetermined point, means for admitting air to the oil chamber above the level of the fuel, a rotatable shaft passing through the oil chamber, and a breaker mounted on the shaft and having radiating blades disposed at an inclination to the axis of rotation of the shaft.

5. A crude oil burner comprising a base having upstanding legs, an oil chamber mounted upon said legs and entirely open at its upper end, the bottom of the chamber being provided with a centrally disposed shaft passage, a series of air openings concentric to the shaft passage, a wall exterior to the openings and extending upward concentric to the shaft passage, a shaft mounted in bearings and extending upward through the oil chamber, means whereby said shaft may be driven, a breaker having radiating blades mounted upon the shaft above the bottom of the oil chamber, an oil supply pipe entering the oil chamber adjacent its bottom, an overflow pipe extending from the oil chamber above the supply pipe but below the bottom of said wall, and a pilot light pipe entering the oil chamber.

6. A crude oil burner comprising a base having upstanding legs and formed to provide a centrally disposed bearing, the legs being formed with an integral spider, an oil chamber having a burner plate constituting the bottom of the oil chamber and detachably mounted upon the upper ends of said legs, the burner plate being formed with a central aperture for the passage of a shaft and with a concentric series of air openings surrounding said shaft passage and with an upstanding, annular wall surrounding said openings, a shaft passing through said shaft passage, through the spider and into the said bearing, a breaker mounted on the shaft and disposed within the oil chamber and having radiating blades, a lubricating oil pipe discharging oil to the bearings of the shaft, a fuel oil pipe entering the oil chamber above its bottom, an overflow pipe extending from the oil chamber above the fuel pipe but below the upper edge of said wall, and a pilot light pipe entering the oil chamber.

7. A crude oil burner comprising a base having upstanding legs and formed to provide a centrally disposed bearing, the legs being formed with an integral spider, an oil chamber having a burner plate constituting the bottom of the oil chamber and detachably mounted upon the upper ends of said legs, the burner plate being formed with a central aperture for the passage of a shaft and with a concentric series of air openings surrounding said shaft passage and with an upstanding, annular wall surrounding said openings, a shaft passing through said shaft passage, through the spider and into the said bearing, a breaker mounted on the shaft and disposed within the oil chamber and having radiating blades, a lubricating oil pipe discharging oil to the bearings of the shaft, a fuel oil pipe entering the oil chamber above its bottom, an overflow pipe extending from the oil chamber above the fuel pipe but below the upper edge of said wall, a pilot light pipe entering the oil chamber, and a regulator mounted within the oil chamber and having radiating arms.

8. A crude oil burner including a bowl-shaped oil chamber, means for supplying oil thereto, means for maintaining the oil at a constant level within the chamber, means disposed within the chamber for drawing air thereinto and mixing the vaporized oil with the air, and means disposed below the chamber for forcing air upward within the chamber.

9. A crude oil burner including a bowl-shaped burner chamber, a pipe entering the chamber near the bottom thereof and supplying oil thereto, an overflow pipe located above the first named pipe and maintaining the oil at a constant level within the chamber, a shaft passing through the chamber, a breaker having vanes mounted upon the shaft and rotating therewith and disposed above the level of the oil in the chamber, and vanes mounted upon the shaft immediately below the chamber, the bottom of the chamber having perforations admitting air thereto.

10. A crude oil burner including a bowl-shaped oil chamber, a pipe supplying oil thereto, an overflow pipe located above the first named pipe and carrying off excessive oil to thereby maintain the oil at a constant level within the chamber, a shaft passing through the bottom of the chamber, the bottom of the chamber being formed with an annular wall concentric to the shaft and extending above the level of the oil in the chamber and with a series of perforations inward of said wall and admitting air into the space between the wall and the shaft, a bladed member mounted upon the shaft above the bottom of the chamber, and a bladed member mounted upon the shaft below the bottom of the chamber.

11. A crude oil burner including a bowl-shaped oil chamber, means for supplying oil thereto, means for maintaining the oil at a constant level within the chamber, the bottom of the chamber having an annular, upwardly extending wall concentric to the shaft and spaced therefrom, and a series of perforations passing through the bottom of the chamber and arranged concentrically to the shaft and admitting air to the interior of the chamber, the shaft extending downward below the chamber, a roller bearing for the lower end of the shaft, a roller bearing for the middle portion of the shaft, means for supplying oil to said upper roller bearing, and means for conducting the oil from the upper roller bearing to the lower roller bearing.

12. A crude oil burner including a bowl-shaped oil chamber, means for supplying oil thereto, means for maintaining the oil at a constant level within the chamber, the bottom of the chamber having an annular, upwardly extending wall concentric to the shaft and spaced therefrom, and a series of perforations passing through the bottom of the chamber and arranged concentrically to the shaft and admitting air to the interior of the chamber, the shaft extending downward below the chamber, a roller bearing for the lower end of the shaft, a roller bearing for the middle portion of the shaft, means for supplying oil to said upper roller bearing, and means for conducting the oil from the upper roller bearing to the lower roller bearing, said means including a cup mounted upon the shaft below the upper roller bearing and receiving drippings of oil therefrom, and a duct formed in the shaft and extending into said cup and extending downward through the lower roller bearing.

In testimony whereof I hereunto affix my signature.

JOHN WESTALL.